United States Patent [19]

Baratta et al.

[11] Patent Number: 4,639,349

[45] Date of Patent: Jan. 27, 1987

[54] NON-INVASIVE LIQUID LEVEL AND DENSITY GAUGE FOR NUCLEAR POWER REACTOR PRESSURE VESSELS

[75] Inventors: Anthony J. Baratta, Tyrone; William A. Jester, State College; Edward S. Kenney, State College; Ira B. McMaster, State College, all of Pa.; Mortimer A. Schultz, N. Palm Beach, Fla.

[73] Assignee: Research Corporation, New York, N.Y.

[21] Appl. No.: 634,659

[22] Filed: Jul. 26, 1984

Related U.S. Application Data

[63] Continuation of Ser. No. 360,194, Mar. 22, 1982, abandoned.

[51] Int. Cl.⁴ .............................................. G21C 17/00
[52] U.S. Cl. ................................... 376/254; 376/258; 250/357.1
[58] Field of Search ............... 376/258, 254, 255, 259; 250/357.1, 390–392

[56] References Cited

U.S. PATENT DOCUMENTS

| | | | |
|---|---|---|---|
| 3,932,211 | 1/1976 | Loving, Jr. | 376/255 |
| 4,016,034 | 4/1977 | Musick | 376/242 |
| 4,079,236 | 3/1978 | Graham et al. | 376/255 |
| 4,216,376 | 8/1980 | Griffin et al. | 250/357.1 |
| 4,358,682 | 11/1982 | Telfer et al. | 250/357.1 |
| 4,369,368 | 1/1983 | Bernard et al. | 250/357.1 |
| 4,377,550 | 3/1983 | Tokarz | 376/258 X |
| 4,394,346 | 7/1983 | Morooka | 376/258 |
| 4,395,633 | 7/1983 | Mathew | 250/357.1 |
| 4,406,011 | 9/1983 | Burns | 376/258 X |
| 4,440,717 | 4/1984 | Bevilacqua et al. | 376/258 X |
| 4,449,403 | 5/1984 | McQueen | 376/258 X |

OTHER PUBLICATIONS

*Nuclear Reactor Engineering,* Glasstone et al., p. 11, 1967.
*Nuclear Radiation Dection,* Price, McGraw-Hill, 1958, pp. 323–325.
"Summary of EPRI and Utility Sponsored Research in Non-Invasive Reactor Vessel Water Level Monitoring", Sep. 1980, NRC Report, Duffey.
*IEE Transactions on Nuclear Science,* "Neutron Flux Measuring Channel", Trenholme et al, Feb. 1967.

*Primary Examiner*—Deborah L. Kyle
*Assistant Examiner*—Dan Wasil
*Attorney, Agent, or Firm*—Scully, Scott, Murphy and Presser

[57] ABSTRACT

A method and means of non-invasively determining the liquid level and density in a nuclear power reactor pressure vessel is disclosed. In general the method consists of detecting neutron levels external of the pressure vessel at least at positions adjacent the bottom of the fuel core, the center of the fuel core and the top of the fuel core; and the detected neutron level signals are directed to monitoring means.

The detecting means may comprise fission chambers and monitoring means may comprise simple electric meters.

10 Claims, 5 Drawing Figures

NON-INVASIVE LIQUID LEVEL AND DENSITY GAUGE FOR NUCLEAR POWER REACTOR PRESSURE VESSELS

This is a continuation of co-pending application Ser. No. 360,194 filed Mar. 22, 1982, now abandoned.

TECHNICAL FIELD

A system is provided for determining the density and level of the primary coolant in the pressure vessels of light water nuclear power reactors.

BACKGROUND OF THE PRIOR ART

The accident at Three Mile Island nuclear generating station Unit-2 (TMI-2) has shown that it is important for all light water nuclear power reactors to have some means for determining the density and level of the primary coolant in the pressure vessel. If data from such a system had been available to the TMI-2 operators, the extensive damage which occurred to this unit might have been avoided.

The system should be able to operate under a wide range of temperature, pressure and radiation levels. It should be capable of operating with the reactor at power and in its shutdown mode and should be able to detect changes in coolant density when the pump(s) is/are running and changes in coolant level when the pumps are turned off. To allow for safe yet rapid backfitting into existing reactors, the system should not require any major modifications to the plant such as penetration of the primary system boundary. Various types of level systems are under consideration. Systems have been proposed which involve the use of such concepts as elastic deformation of the pressure vessel, Cerenkov radiation monitoring, and the use of ultrasonic or microwave emission and detection. It is known there are many potentially interfering signals which effect the accuracy and reliability of some of the proposed concepts. The interfering signals originate from such sources as the intense gamma and neutron fields, system vibrations, and the lack of a clear sharp boundary between the steam and water in a light water reactor undergoing a loss-of-coolant accident. Some of the proposed concepts would require new penetrations of the reactor pressure vessel, and most would require extensive and expensive retrofitting. In addition, they would require substantial testing to verify that a chosen solution would provide the desired information under accident conditions and that it would not compromise the safety and performance of the plant.

BRIEF SUMMARY OF THE INVENTION

By studying the TMI-2 accident data, it has been found that the source range neutron detectors (SRD) behaved as coolant density monitors in the period between 20 and 100 minutes after the turbine trip, and as a liquid level gauge during much of the period in which the core was partially uncovered, i.e., between about 100 to 175 minutes after the turbine trip.

It has been discovered that reactor-produced neutrons, with properly positioned external neutron monitors, can be used to provide information for gauging coolant density change under "Pump On" conditions and liquid level changes under "Pump Off" conditions.

It has also been determined from a study of the TMI-2 accident data that shortly after shutdown, the primary source of neutrons is the ($\gamma$,n) photoneutrons produced by the interaction of fission product gamma rays (high energy photons) with deuterium atoms in the coolant water rather than the Antimony-Berylium-Curium (ABC) neutron sources. For example, at 120 minutes after shutdown the photoneutron source intensity was estimated to be $1 \times 10^{11}$ neutrons per second while the combined strength of the two Antimony-Berylium-Curium fixed sources was about $3 \times 10^9$ neutrons per second. Since the neutrons are produced in the coolant by the ($\gamma$,n) reactions, changes in coolant level relative to a given detector will alter the source detector geometry. Thus there is a fall-off of photoneutron production as well as a continual change in the source-detector geometry relationship with a decrease in density or level of the coolant water. Many of these primary neutrons are thermalized in the coolant and lead to fission events in the nuclear fuel. Thus secondary fast neutrons are produced through this multiplication process, such that with a core full of coolant about 60% of the neutrons seen by the SRD come from core multiplication and not directly from the photoneutron process. This percent was found to increase with decreasing coolant level. Both coolant density and coolant level changes affect neutron multiplication. Multiplication decreases with increased voiding as well as with decreased coolant level.

The majority of the neutrons reaching the SRD originated as photoneutrons which then had undergone multiplication in that region of the core closest to the SRD and escaped through the reactor water downcomer and reactor vessel wall as fast neutrons. They were then moderated by the polyethylene liner surrounding the SRD and by the concrete in the shield wall. The resulting thermal neutrons were detected by interactions with the boron in the SRD.

Study of the TMI-2 accident data also showed that the use of a single detector can provide ambiguous readings since more than one combination of conditions such as coolant level and boron concentration can produce the same count rate in the SRD.

We found that in order to obtain clear and quantiative information concerning coolant density when the pump(s) is/are running, or coolant level when the pumps are shutdown, the system would need three or four neutron detectors located outside the reactor vessel. One would view neutrons coming primarily from the lower core region, one would view neutrons coming primarily from the mid-core region, one would view neutrons coming primarily from the upper core region and one would view neutrons coming from above the core region. In general the detectors would be placed in one or more of the existing nuclear instrumentation wells which surround a reactor vessel. Some power reactors have as many as 12 such wells and often contain a few unused wells. If no spare wells are available, dual usage would be made of one or more of the operational instrument wells. For a BWR, an alternate location such as a position in the drywell may be employed. Thus, no additional structures would have to be installed to retrofit a reactor for using the gauging system of the invention.

For acceptable instrument operating life under conditions of long exposure at full reactor power, the detectors, in the illustrated form of the invention are fission chambers of a conventional design, shielded from thermal neutrons, rather than the more commonly used BF-3 detectors. There are a few differences between fission chambers and BF-3 detectors, but fission chambers have been successfully employed in many reactors. Thus currently available detectors based on proven technology can be used.

DEFINITIONS

Throughout the specification and claims the following words, terms and acronyms mean:
  TMI-2—Three Mile Island nuclear generating station Unit-2;
  LOCA—loss-of-coolant accident;
  SRD—source range neutron detectors;
  ABC—Antimony-Beryllium-Curium neutron sources;
  BWR—boiling-water reactor;
  PWR—pressurized-water reactor;
  BF-3—boron trifluoride type neutron detector;
  Non-Invasive—positioned external of the reactor pressure vessel

BRIEF DESCRIPTION OF THE DRAWINGS

The invention will be more fully described in reference to the drawings wherein.

DETAILED DESCRIPTION OF THE INVENTION

Figure 1:
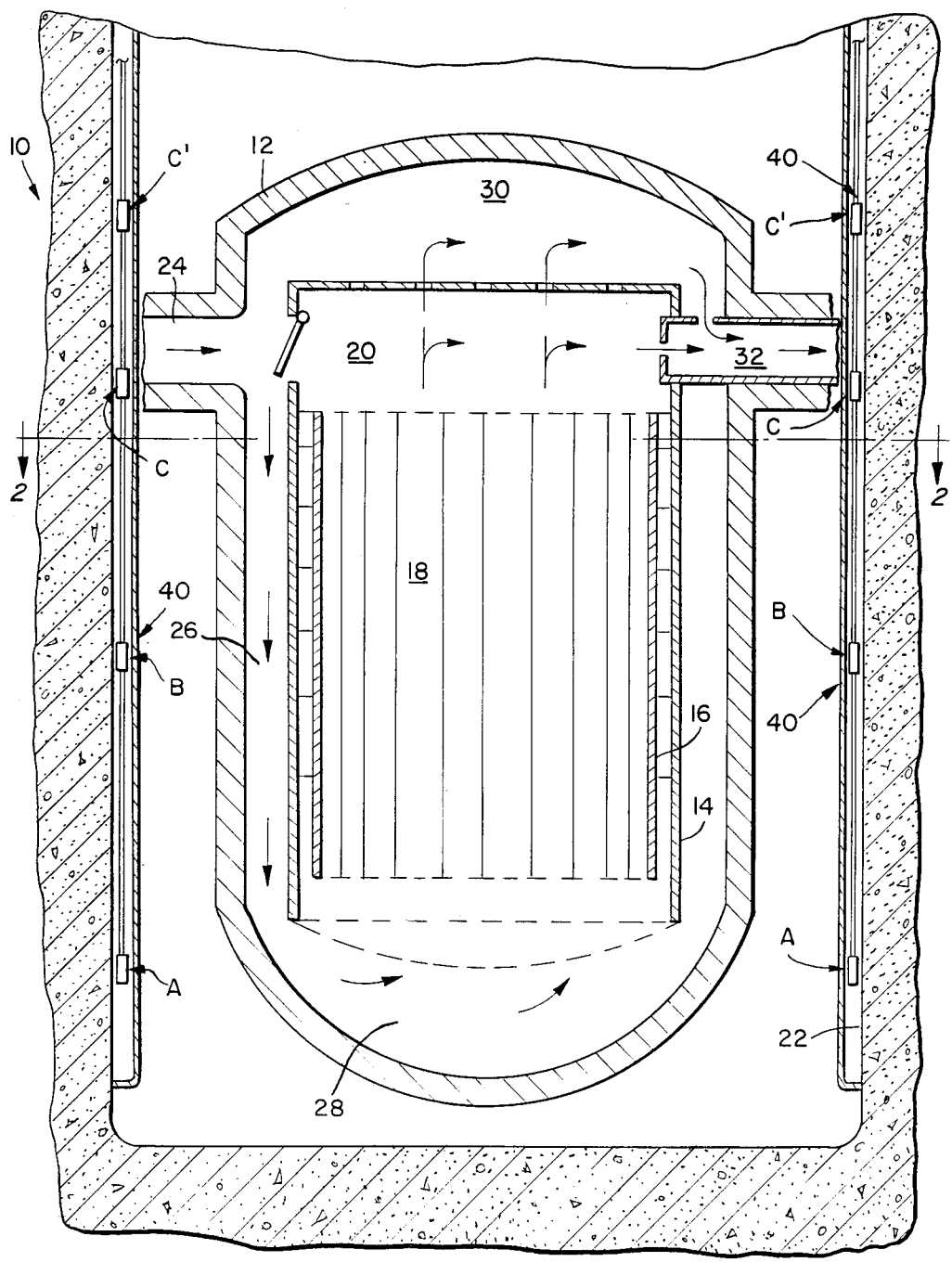
FIG. 1 is a fragmentary partial sectional view through a typical light water reactor.
Figure 2:
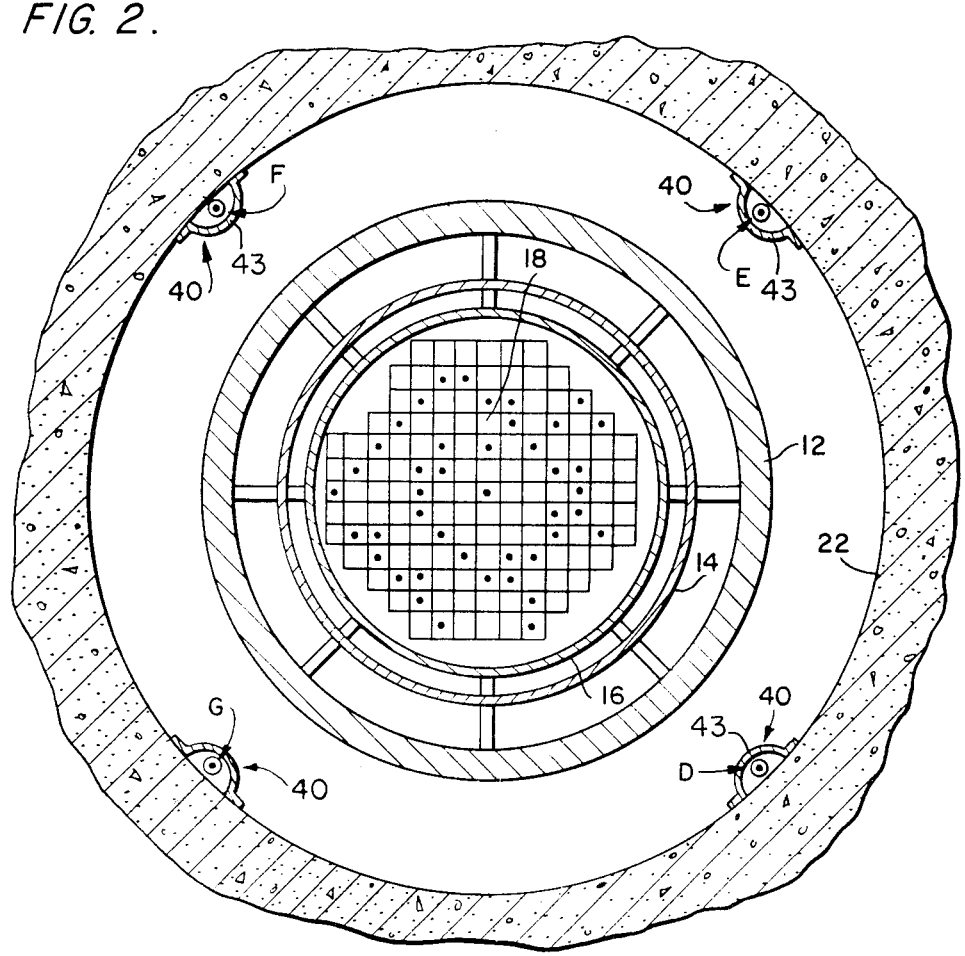
FIG. 2 is a section on line 2—2 of FIG. 1.

Referring to the drawings and in particular FIGS. 1 and 2 thereof, 10 generally designates a basic reactor configured as a typical light water reactor. The reactor vessel designated 12 has mounted therein a thermal shield 14 and a core barrel 16. Within the core barrel are the fuel assemblies mounted in the conventional grid designated 18. Above the grid 18 is a plenum assembly 20.

The entire assembly is contained within a concrete shield wall generally designated 22.

The reactor is provided with a plurality of light water inlets designated 24. The inlets feed into downcomers 26 and the flow of light water passes upwardly from the bottom area of the reactor designated 28 through the grid assemblies and the fuel assemblies into the plenum 20. From the plenum assembly and the top of the reactor in the zone 30 the heated water and vapor pass from the reactor vessel via outlets 32.

For clarity various internal instrument locations, power range neutron detectors, source range neutron detectors, control rods and the like have not been illustrated.

The concrete shield wall supports a plurality of instruments tubes or wells generally designated 43. These instrument tubes or wells, as to be more fully described hereinafter, house the neutron detectors, preferably of the fission chamber type. The instrument tubes or wells 43 may be placed in the concrete shield wall 22 or, for example, the wells may be positioned in a water shield tank. The exact location of the wells will depend to a large extent on the type of reactor.

In FIG. 1 there are illustrated, in vertical alignment, four fission chamber detectors. The fission chamber detectors are designated A, B, C and C'.

In FIG. 2 it will be noted that there are more than one vertical arrangement of the detectors A, B, C and C' to make the detection system more reliable. These assemblies are designated D, E, F and G.

Detectors A and C would give roughly the same readings since they have nearly the same geometry in respect to their position to a major section of the core. Detector B provides a higher neutron reading because of the smaller path length between the detector and the reactor core 18.

Detector A would be a reference detector to which the outputs of the other two detectors are normalized. Such ratio-type measurements would not be significantly affected by changes in operational or shutdown power level.

Some density change will normally occur as the coolant moves through the core so that the water below the core would be more dense than that above in the core. This can be used as a convenient instrument calibration check since changing the power level would give a known change in outlet water density compared to inlet water density. Under an accident situation, the bottom section of the reactor vessel would be the last region to be voided, thus the detector A would always be looking at a reactor through a uniform volume of inlet coolant water which is less susceptible to voiding than the water closer to detectors B and C and/or C'.

Detectors B and C and/or C' would be used to detect level and density changes. The detectors in position C and/or C' would be the main gauge monitor for the first few hours after reactor shutdown. Normally, having more mass of water between the reactor core and detectors C and/or C' would make them more sensitive to small changes in fluid density than detector B. Detectors C and/or C' would also be the first to detect a drop in coolant level at the top of the core. If one wants to avoid complications produced by the variation in water level in the downcomer, then detector C could be positioned closer to the top of the pressure vessel as shown at C'.

Detector B could also serve the reactor as a source range neutron detector during normal operation, but would serve as the gauge monitor beyond the first few hours after shutdown, since its location is closer to the core it would receive a stronger neutron signal than detectors C and/or C' at that time. Detector B might also be employed to cross check whether or not a change in detectors C and/or C' reading is caused by a change in fluid density, a change in liquid level, or the filling of the downcomer.

During a loss of coolant accident (LOCA) the system would be expected to respond in the following manner. As the system pressure decreases, voiding would occur in the upper region of the reactor. The fast neutron leakage seen by the uppermost detectors, detectors C and/or C' would increase due to the lower density of the steam water mixture and the count rate would also increase. As more water leaves the system, a clear steam water interface would eventually form in the upper portion of the pressure vessel further increasing the neutron leakage and the signal from detectors C and/or C'. Eventually the water level would decrease to the point that the increase in neutron leakage would be offset by the loss of water available to produce neutrons from the ($\gamma$,n) reaction. As a result, the output from detectors C and/or C' would peak and then begin to decrease. Based on the TMI-2 experience, this would occur when the water level has reached about the midpoint of the detector. If high pressure injection (HPI) of water were started around this point in time, the output of detectors C and/or C' would also decrease due to increase in water level. Thus, if detectors C and/or C' were the only detector available, one could not tell if the water level were decreasing or increasing. To remove the ambiguity, one needs only to observe the response of detector B. As the water level drops, the leakage seen by detector B would increase because of the increased leakage. If HPI occurs, detector B's output would begin to decrease along with that of detectors C and/or C'. Observation of outputs from the plural detectors would thus give positive indication that the water level has or has not passed below the midpoint of detectors C and/or C'.

The outputs of detectors B and C and/or C' would be normalized to detector A. This normalization provides for compensation of the signals due to such factors as changes in boron concentration and changes in gamma source strength due to fission product decay.

If it was required to have the three or four detectors operate both during shutdown and at various power levels, a mixing circuit could be employed. This circuit would allow the detectors to be operated as sensitive neutron counters during shutdown. At higher reactor power levels, the detectors would act as ion chambers and thereby not suffer loss of signal due to resolving time losses of neutron counters. Such circuits exist and are comnercially available.

Figure 5:
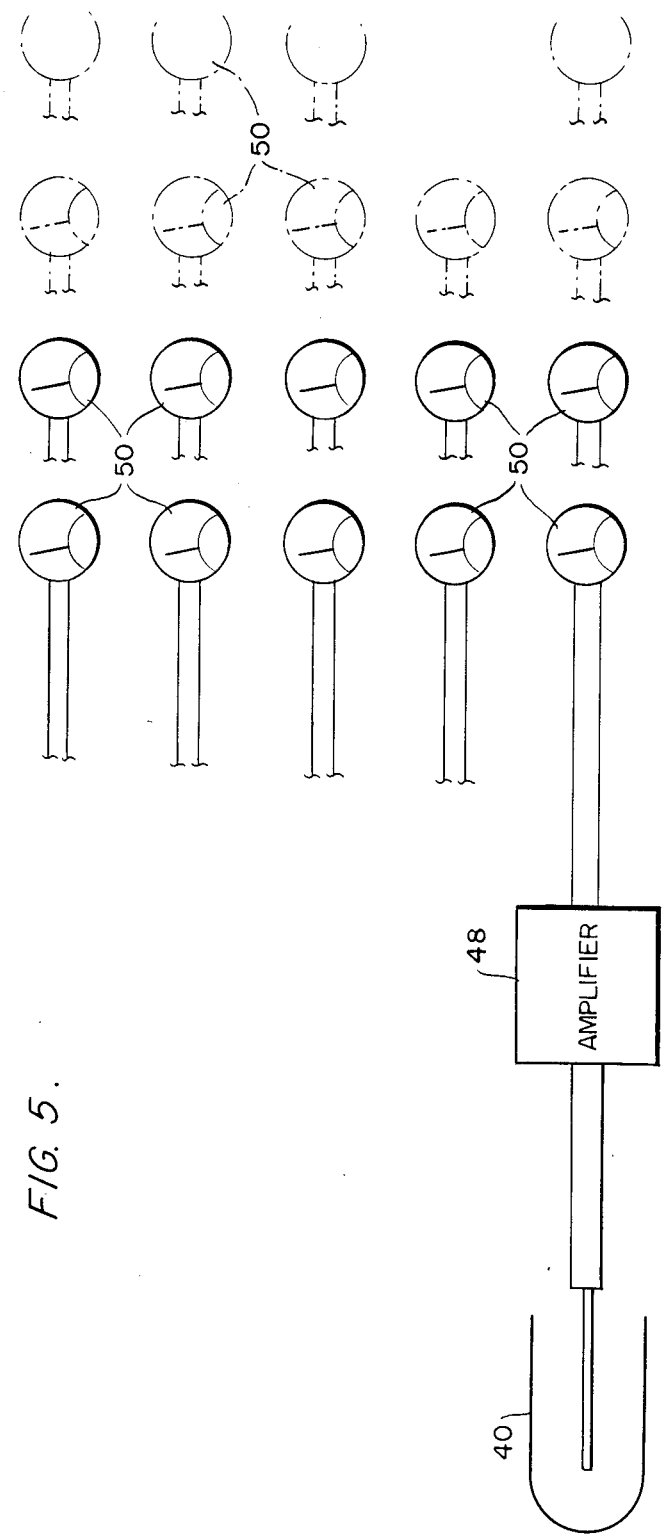
FIG. 5 is a diagrammatic showing of suitable instrumentation for certain of the detectors.

The output of the detectors could be on individual meters, as shown in FIG. 5, and/or the signals could be processed for simple presentation to operator personnel by a microprocessor. The important factor in this system is not the form of the final readout which can be provided at any desirable degree of sophistication, but the fact that the system can be installed with a minimum of disturbance to existing installations.

The Detectors

Figure 3:
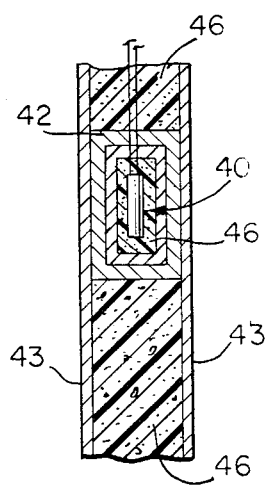
FIG. 3 is a fragmentary view of one of the detectors in an instrument well.
Figure 4:
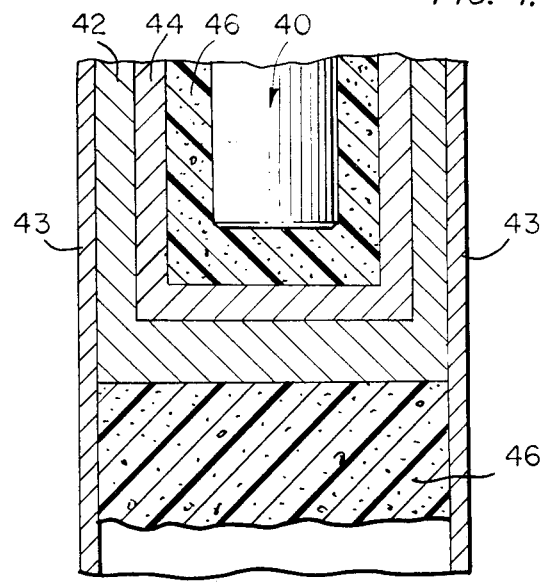
FIG. 4 is an enlarged view like FIG. 3 illustrating typical shielding of one of the detectors.

The type of sensors or detectors 40 and the nature and parameters of the shielding thereof will be described in reference to FIGS. 3 and 4.

The detectors must be capable of operating with the reactor either shutdown, or at power. Because of the high radiation levels seen by the detectors at power and the high sensitivity required at shutdown, probably the most suitable detector capable of operating over the entire range is a fission chamber. The chamber should be capable of operating in both the pulse and current mode. Several such devices are available from a variety of vendors. The differences in the vendors' detectors are primarily in the range and ultimate sensitivity of the device. As examples of suitable fission chambers are types WL-23074; WL-23150; WL-23110 and WL-23065 manufactured by Westinghouse.

Because the fission chambers are sensitive to neutrons having a wide range of energies and to gamma rays, the detectors must be shielded. The exact nature and extent of the shielding is established with knowledge of the specific reactor involved. Certain criteria, however, can be laid down that the shielding must meet.

Since the detectors 40 are sensitive to gamma radiation, they must be shielded against gamma radiation from the reactor core. Typically, the shielding takes the form of the lead "boot" 42 which surrounds the instrument well in which the detectors are placed. For the gamma radiation levels typical of this type installation and the detectors under consideration, this requires a thickness of 2 to 4 inches of lead.

It is also necessary to prevent low energy neutrons from reaching the detector. The low energy, or thermal neutrons, do not carry with them information concerning water level and density in the core region. As a result, these low energy neutrons act as a noise source which interferes with proper operation of the system. To eliminate these neutrons, each detector is surrounded by a neutron absorbing material 44 such as cadmium and/or boron. The exact amount and specific combination of materials depends on the reactor in question. It is estimated, however, that 0.025" to 0.050" of cadmium should be sufficient. In addition, a comparable amount of boron may also be necessary to eliminate slow but non-thermal neutrons from reaching the detector.

Another source of signal which can interfere with proper operation of the level gauge is neutrons scattered up the instrument tube. These neutrons can be eliminated by use of polyethelene 46 placed in the space between the detectors and the well. The thickness should be sufficient to completely fill the regions of the tube not filled by the detectors.

As heretofore indicated, it is considered that at a minimum, the system will use three and/or four detectors mounted in instrument tubes external to the pressure vessel. One would be mounted above the reactor core and would view neutrons coming from the region above the reactor. Another would be mounted at approximately the top of the core and would see neutrons originating in the upper core region. A third detector would be mounted at the mid-plane of the reactor core and would view neutrons coming primarily from the mid-core region. The fourth detector where needed would be mounted near the bottom of the core and would view neutrons from the lower core region. The number of detectors employed would depend on the water level height and spatial resolution desired.

Arranging the detectors in this manner will allow level and density information to be obtained from all four regions of the reactor pressure vessel. Additional detectors could be added to improve system water level resolution. That is, a fifth and sixth detector might be added between the mid-core and bottom detector and between the mid-core and the upper detector. The number of additional detectors would depend on the size of the core and pressure vessel and the height and density resolution desired.

In addition, as is good commercial practice, and as heretofor set forth, one would have multiple sets of detectors and instrumentation to improve overall system reliability. Typically, this means three or four sets of detectors located as described.

As hereinbefore set forth, instrumentation for the non-invasive liquid level and density gauge would depend to a large extent on the size and complexity of the particular reactor. It is contemplated that in the future, in order to reduce personnel fatigue etc., many of the instruments presently employed with reactors including instrumentation for the detectors of the present invention would be consolidated into a computer system with appropriate programming. The system would thereby continuously monitor the functions of the liquid level detectors in addition to the other parameters which are usually monitored in a reactor and instruct or carryout procedures for maintenance of the reactor at the desired power level.

However, as hereinbefore set forth, a simple form of instrumentation would be that illustrated diagrammatically in FIG. 5. In FIG. 5 the plural fission chambers designated 40 would each send its signal to individual amplifiers 48 and the output from the amplifiers would be directed to visual type meters 50. With such a simplified system it would be necessary for the operators to detect malfunctioning in the reactor from the meters and then take appropriate steps if the meter readings from the plural detectors indicated malfunctioning or possible malfunctioning in the liquid level in the reactor.

While in the illustrated form of the invention the detectors have been shown and described as being of the fission chamber type other common neutron detectors (i.e. BF$_3$ gas filled detectors, boron lined detectors, and compensated ionization chambers) can also be used in place of fission chambers.

STATEMENT OF INDUSTRIAL APPLICATION

A system is disclosed which will operate under a wide range of temperature, pressure and radiation levels and be capable of presenting quantitative information concerning coolant density when the reactor pumps are running, or coolant level when the pumps are shut down thus providing an early indication of possible loss of coolant in the reactor.

We claim:

1. A method of non-invasively determining the coolant liquid level and density in a nuclear power reactor pressure vessel, comprising the steps of:
   detecting neutron levels with at least three neutron detectors positioned external of the pressure vessel of multiple spaced positions along the side of the fuel core, with one of the neutron detectors being positioned at the side near the bottom of the fuel core, with the multiple spaced positions along the side removing any ambiguity as to whether the liquid level is decreasing or increasing;
   shielding the neutron detectors from thermal neutrons to avoid the noise associated therewith;
   eliminating the effects of gamma radiation from the detected signals;
   amplifying the detected neutron level signals; and
   monitoring the amplified signals to determine the coolant liquid level and density in the nuclear power reactor pressure vessel.

2. A method of non-invasively determining the liquid level and density in a nuclear power reactor pressure vessel as claimed in claim 1, said step of detecting neutron levels including detecting the neutron levels with at least four detectors positioned external of the pressure vessel at multiple spaced positions along the side of the fuel core, with one of the neutron detectors being positioned at the side near the top of the fuel core.

3. A method as claimed in claim 1 wherein the neutron detectors are placed in side well means along the side of the nuclear reactor pressure vessel.

4. A method of non-invasively determining the liquid coolant level and density in a nuclear power reactor pressure vessel comprising the steps:
   positioning at least three neutron detector fission chambers externally of the reactor pressure vessel at multiple spaced positions along the side of the fuel core, with one of the neutron detectors being positioned at the side near the bottom of the fuel core, with the multiple spaced positions along the side removing any ambiguity as to whether the liquid level is decreasing or increasing:
   shielding the neutron detector fission chamber from thermal neutrons to avoid the noise associated therewith, and
   eliminating the effects of gamma radiation from the detected signals;
   monitoring the detected neutron level signals to determine the coolant liquid level and density in the nuclear power reactor pressure vessel.

5. A method of non-invasively determining the liquid level and density in a nuclear power reactor pressure vessel as claimed in claim 4, said step of positioning at least three fission chambers, including positioning at least four fission chambers external of the reactor pressure vessel at multiple spaced positions along the side of the fuel core, with one of the fission chambers being positioned at the side near the top of the fuel core.

6. A method of non-invasively determining the liquid level and in a nuclear power reactor pressure vessel as claimed in claim 4, wherein the fission chambers are positioned in side well means along the side of the nuclear reactor vessel.

7. Apparatus for the non-invasive determination of the liquid coolant level and density in a nuclear reactor pressure vessel comprising:
   at least three neutron level detectors;
   means mounting said detectors external of the pressure vessel at multiple spaced positions along the side of the fuel core, with one of the neutron detectors being positioned at the side near the bottom of the fuel core, with the multiple spaced positions along the side removing any ambiguity as to whether the liquid level is decreasing or increasing;
   shielding means for each detector for shielding the detector from thermal neutrons to avoid the noise associated therewith;
   means for eliminating the effects of gamma radiation from the detected signals;
   means for amplifying signals from each of neutron level detectors;
   means for monitoring at least one amplified signal to determine the coolant the liquid level and density in the nuclear power reactor pressure vessel.

8. Apparatus as defined in claim 4, wherein the shielding comprises cadmium, and/or boron, and polyethylene.

9. Apparatus as specified by claim 7, including at least four neutron level detectors mounted external of the pressure vessel at multiple spaced positions along the side of the fuel core, with one of the neutron detectors being positioned at the side near the top of the fuel core.

10. Apparatus as specified by claim 7, wherein the neutron level detectors are positioned at multiple spaced positions in a side well along the side of the nuclear reactor pressure vessel.

* * * * *